Aug. 19, 1958 J. H. W. ADENSTEDT 2,848,553

RINGING DEVICE FOR TELEPHONE SYSTEMS

Filed Oct. 1, 1953 2 Sheets-Sheet 1

INVENTOR
JOHN HELGE WILLY ADENSTEDT
BY Fredrick E. Hany
ATTORNEY

RINGING DEVICE FOR TELEPHONE SYSTEMS

Filed Oct. 1, 1953 2 Sheets-Sheet 2

INVENTOR
JOHN HELGE WILLY ADENSTEDT
BY Fredrick E. Hane
ATTORNEY

United States Patent Office 2,848,553 Patented Aug. 19, 1958

2,848,553

RINGING DEVICE FOR TELEPHONE SYSTEMS

John Helge Willy Adenstedt, Stockholm, Sweden, assignor to Telefonaktiebolaget L M Ericsson, Stockholm, Sweden, a corporation of Sweden Application October 1, 1953, Serial No. 383,639

Claims priority, application Sweden October 3, 1952

3 Claims. (Cl. 179—84)

This invention relates to a device for generating ringing currents in subscriber's lines specifically in small telephone plants with a central battery.

In small manual exchanges and in small automatic rural exchanges a ringing machine or pole changer for transmitting signals will constitute a considerable part of the costs of the exchange equipment. To protect the microphone and the receiver in a subscriber's apparatus against ringing current particular relays are used, which break the ringing signal, when the called subscriber answers. In telephone plants with a central battery there are always feeding relays, which limit the feeding current and transmit answering and clearing signals.

According to this invention the ringing machine and special ring-trip relays are eliminated. The feeding relay is used as an interrupter relay for supplying the current pulses serving as ringing current and also as ring-trip relay. This is achieved by the relay being provided with at least one winding in the feeding circuit of a subscriber's line connected to the relay and by means of an interrupter contact on the feeding relay included in a local circuit in the telephone exchange, which circuit contains the central battery, said interrupter contact and a winding on the feeding relay, and which is closed, when a ringing signal is to be emitted on the subscriber's line, and generates an alternating voltage over the subscriber's line.

The invention will be described below more in detail in connection with the annexed drawings, Figs. 1–4.

Figure 1:
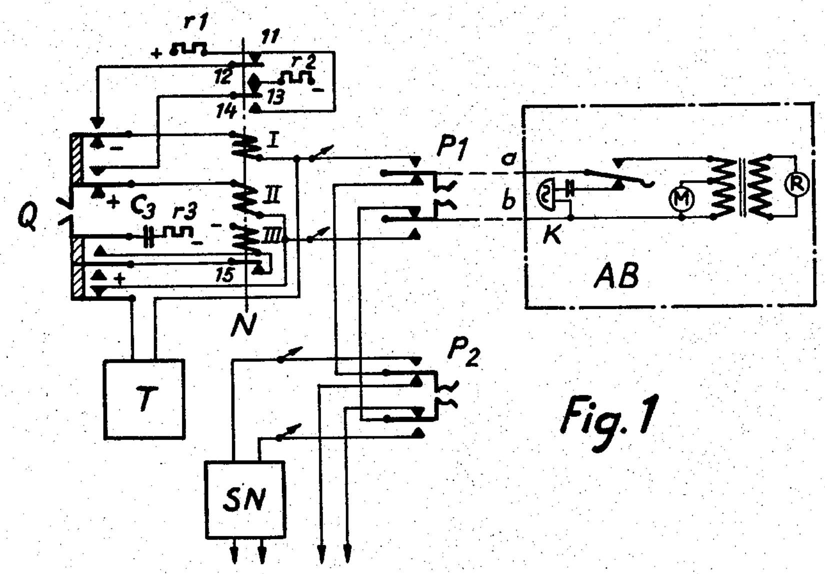
Fig. 1 shows the application of the invention in a small manual exchange.

In Fig. 1 AB is a subscriber's apparatus connected to a subscriber's line *a*—*b*. For each subscriber's line there are two press-button keys P1 and P2 in a manual exchange. By means of the push button P1 the subscriber's line is connected to an operator's equipment T combined with a ringing key Q and a feeding relay N. When a ringing signal is to be emitted, the key P1 is pressed and the ringing bell K. The subscriber's apparatus AB at this time is connected to the line *a*—*b*. The ringing key Q is actuated whereby the operator's equipment T is disconnected and a circuit is closed over the interrupter contact 15 through winding III on the feeding relay N. At the same time winding I is switched from minus to + over the resistance *r*1 and the contact 11 and the winding II from + to minus over the contact 13 and the resistance *r*2. The direction of current in the winding II is so chosen that the voltage induced in the windings I and II during the magnetization adds to the battery voltage in the following circuit: +, resistance *r*1, contact 11, key Q, winding I, key P1, line branch *a*, the condenser and ringing bell K in the subscriber's apparatus AB, line branch *b*, key P1, winding II, key Q, contact 13, resistance *r*2 to minus. The relay N attracts its armature because of the current through the winding III. The contacts 11—15 are actuated. The condenser C3 is recharged in series with the resistance *r*3 during the make-time of the relay N and discharges through the winding III, when the contact 15 is closed so that the armature of the relay attracts distinctly. The contacts 11—14 switch the pole of the exchange battery, so that an alteration of current is obtained in the subscriber's line, and so that the battery voltage cooperates with the voltage induced when relay N is released in the following circuit: +, resistance *r*1, contact 13, key Q, winding II, key P1, line branch *b*, ringing bell K and condenser in the subscriber's apparatus AB, line branch *a*, key P1, winding I, key Q, contact 12, resistance *r*2, to minus. As long as the ringing key Q is pressed alternating current is thus fed to the subscriber's apparatus AB. If the called subscriber answers while the signal is still ringing, a direct current circuit is closed over the microphone M and the relay N is maintained in operated position, whereby the alternating current disappears. The relay N is held in the following circuit, when the key Q is pressed: +, resistance *r*1, contact 14, winding II, key P1, line branch *b*, microphone M, the transformer and cradle contact in the subscriber's apparatus AB, line branch *a*, key P1, winding I, key Q, contact 12, resistance *r*2, to minus. When the ringing key Q is released, the direction of current is maintained in the windings I and II and in the line *a*—*b* and the operator's equipment T is again connected.

The description above shows that the relay N has three different functions, viz. to serve as a feeding relay, as a ringing current generator and as circuit breaker breaking the ringing, when the called subscriber answers.

Figure 2:
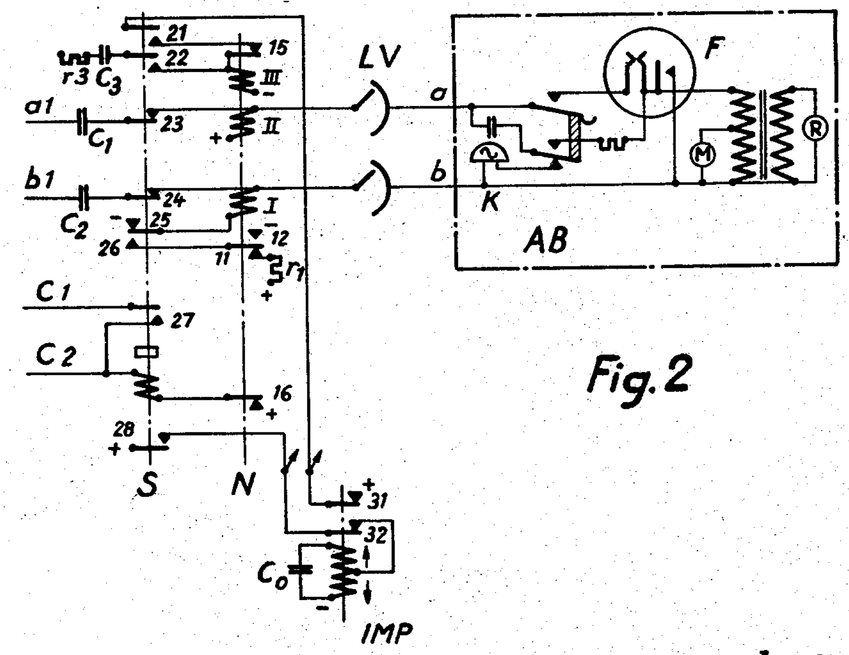
Fig. 2 shows the application of the invention in a link circuit to an automatic exchange.

The key P2 is used to connect the line *a*—*b* to a communication SN. In Fig. 2, LV is a final selector included in a connection to a subscriber's line *a*—*b* with pertaining subscriber's apparatus AB. To the final selector LV there pertains a relay set, of which set two relays S and N, two resistances *r*1 and *r*3 and three condensers $C_1$, $C_2$ and $C_3$ are shown on the drawing. The subscriber's apparatus is provided with a dial F. Furthermore there is a relay IMP with two windings counteracting each other that is common to a plurality of final selectors LV and determines the duration of the ringing signals and the interval between the ringing signals. To IMP there pertains a large condenser $C_0$. When the final selector LV is set and ringing signal is to be emitted the slow operating relay S is operated by means of a current impulse over the wire *c*2 and is then energized over the contact 27 and the wire *c*1. The contacts 21—28 are actuated. The relay N is energized through winding III over the contacts 31, 21 and 15. The condenser of the apparatus AB is discharged through the bell K and the windings I and II and the resistance *r*1, whereby the voltage of the condenser cooperates with the voltage induced by the current in winding III in the windings I and II. The relay N attracts its armature and the contacts 11, 12, 15 and 16 are actuated. The relay S holds its armature because it is slow releasing. The relay N is released when the self-breaking contact 15 is actuated, and the condenser in the subscriber's apparatus is recharged whereby the battery voltage and the voltage induced in the windings I and II cooperate.

The relay N generates ringing current until the relay IMP, which is energized over the contacts 28 and 32 through its lower winding, attracts its armature. This occurs when the great condenser $C_0$, which is energized through the upper winding of the relay, is charged. The contacts 31—32 are actuated. The relay N remains in released position during the release time of the relay IMP. The condenser $C_0$ is discharged through the relay IMP, whereby the two windings cooperate. The release time of the relay IMP determines the duration of the interval between the ringing signals.

When the called subscriber answers, the relay N is retained in operated position and the relay S releases its armature and can then not attract again.

The condenser C3 and the resistance *r*3 serve as spark extinguishing means and as auxiliary circuit for the opening relay N. The wires *a*1 and *b*1 are the talking wires of the final selectors LV.

Figure 3:
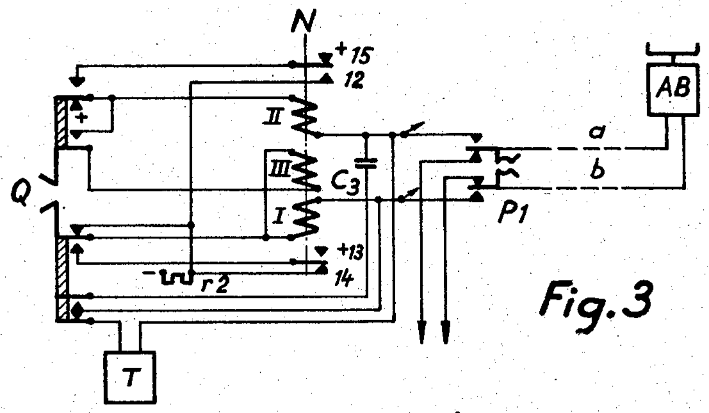
Figs. 3 and 4 show different embodiments of the invention.

The invention may be varied in many different manners and Figs. 3–4 show a further number of embodiments.

Fig. 3 connects on to Fig. 1 and shows how a further increase of the voltage of the ringing current may be obtained by changing the direction of current in the auxiliary winding II simultaneously as the connection of the poles of the exchange battery to the subscriber's line is changed. When the key Q is actuated, the following circuit is completed: +, contact 15, key Q, windings I and II connected in series with the subscriber's line *a*—*b* and connected in parallel with the winding III, key Q, contact 14, resistance *r*2, to minus. The current through the winding III energizes the relay N and the contacts 12—15 are actuated. The discharge current from the the condenser C3 helps the relay N to attract its armature and to hold it for a short moment.

When the contacts 14 and 15 are closed the discharge current from the condenser C3 passes through all windings I–III, which hereby cooperate. Then the direction of current is changed in all windings I–III and thus also in the subscriber's line. This continues as long as the key Q is pressed and until the subscriber answers, whereafter the relay N is held in operated position by the feeding current flowing through the windings I and II. The connecting device works for the lowest occurring battery voltages.

Figure 4A:
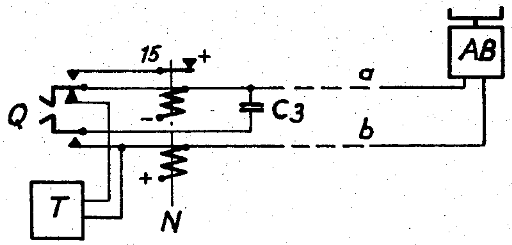

Fig. 4*a* shows a simplified embodiment of the invention which is usable when the voltage of the central battery is not too low. When the key Q is pressed, the line *a*—*b* is short-circuited until relay N attracts its armature. When the contact 15 is actuated the magnetic energy of the relay N is transmitted to the condenser C3 as well as to the ringing device in the subscriber's apparatus AB. Repeated current impulses are sent over the subscriber's line and actuate the ringing device. When the subscriber answers, the ringing is stopped by the relay N being retained in operated position.

Figure 4B:
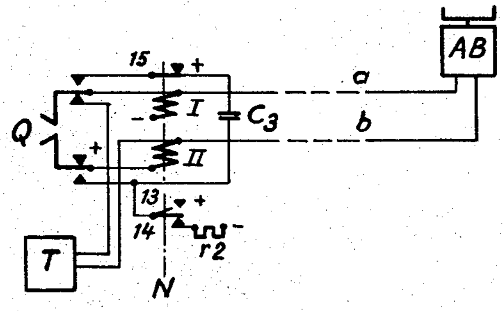

In Fig. 4*b* there is shown how the ringing device according to Fig. 4*a* may be improved by arranging alternate connection of the poles of the battery to the line branch *b* by means of auxiliary contacts 13—14. The voltages induced in the winding II will cooperate with the voltages derived from the central battery, if the windings I and II cooperate, when answer has been received from the subscriber's apparatus AB.

I claim:

1. In a telephone exchange, in combination, a subscriber's station, a called line leading to said station, signalling and feeding circuit means connected with said called line, a central battery, a vibratory relay means including a feeding coil, a signalling coil and an interrupter contact, circuit means connecting said feeding coil in series with said battery and said line, and operating means for connecting said signalling coil, said interrupter contact and said battery in a series circuit causing said relay means to vibrate for supplying current pulses to said line, said feeding coil being connected for holding the relay means energized when the said station answers.

2. A telephone exchange according to claim 1, wherein said relay means further comprise auxiliary contacts controlled by the energization of said relay means, said contacts controlling circuit means connecting said called line and said feeding coil with the battery in a timed relationship with current pulses and in a direction such as to increase the voltage of the current pulses.

3. A telephone exchange according to claim 1, wherein said relay means further comprise auxiliary contacts controlled by the energization of said relay means, said contacts in conjunction with said interrupter contact controlling circuit means for changing the polarity of the circuit connection between the battery and said called line and said feeding coil in timed relationship to said flow of current pulses.

References Cited in the file of this patent

UNITED STATES PATENTS

| | | |
|---|---|---|
| 1,200,829 | Goodrum | Oct. 10, 1916 |
| 1,292,499 | Martin et al. | Jan. 28, 1919 |
| 1,512,584 | Dunham | Oct. 21, 1924 |